United States Patent [19]

Satou et al.

[11] 4,212,798

[45] Jul. 15, 1980

[54] PROCESS OF PRODUCING SOYBEAN AND/OR SOY PROTEIN PRODUCTS

[75] Inventors: Osahiro Satou, Kawasaki; Makoto Yamaguchi; Mikio Hasegawa, both of Yokohama, all of Japan

[73] Assignee: Ajinomoto Company, Incorporated, Tokyo, Japan

[21] Appl. No.: 37,821

[22] Filed: May 10, 1979

[30] Foreign Application Priority Data

May 11, 1978 [JP] Japan ................................. 53/55980

[51] Int. Cl.$^2$ ............................................. A23J 1/14
[52] U.S. Cl. ................................. 260/123.5; 426/656
[58] Field of Search ............................. 260/123.5

[56] References Cited

U.S. PATENT DOCUMENTS

| | | | |
|---|---|---|---|
| 2,444,241 | 6/1948 | Beckel et al. | 260/123.5 X |
| 2,495,706 | 1/1950 | De Voss et al. | 260/123.5 X |
| 2,615,905 | 10/1952 | Forstmann et al. | 260/123.5 X |
| 3,043,826 | 7/1962 | Beaber et al. | 260/123.5 |
| 3,207,744 | 9/1965 | O'Hara et al. | 260/123.5 |
| 3,365,440 | 1/1968 | Circle et al. | 260/123.5 |
| 3,459,555 | 8/1969 | King | 260/123.5 |
| 3,897,574 | 7/1975 | Pass | 260/123.5 X |
| 3,926,940 | 12/1975 | Circle et al. | 260/123.5 |
| 4,144,229 | 3/1979 | Karnofsky | 260/123.5 |

*Primary Examiner*—Howard E. Schain
*Attorney, Agent, or Firm*—Oblon, Fisher, Spivak, McClelland & Maier

[57] ABSTRACT

Soybean and/or soy protein products are prepared by:
(a) contacting a soy protein-containing material with an ethanol-water mixture;
(b) separating the liquid fraction from the suspension of step (a);
(c) dividing the liquid fraction into first and second portions;
(d) diluting the first portion with water to an ethanol concentration of less than 40%;
(e) subjecting the diluted portion to extractive distillation in a tower at a temperature in the range of 80° C. to 95° C.;
(f) removing volatile materials from said diluted portion and recovering distillation bottoms from said extractive distillation;
(g) subjecting the distillation bottoms to azeotropic distillation and recovering the distilled portion thereof; and
(h) combining said distilled portion with said second portion of step (c) as the feed material for step (a).

10 Claims, 2 Drawing Figures

PROCESS OF PRODUCING SOYBEAN AND/OR SOY PROTEIN PRODUCTS

BACKGROUND OF THE INVENTION

1. Field of the Invention

The present invention relates to a process for producing soybean and/or soy protein products. This process relates to a technique for removing undesirable odors and tastes from soybeans and/or soy protein products.

2. Description of the Prior Art

It is known that the constituents of soybeans and/or soy protein products which give rise to undesirable odors, taste and color in the same can be extracted or removed when soybeans, defatted soybeans and extracted soy protein and the like, are immersed into an organic solvent such as ethanol, propanol, alcohol-water, or alcohol-n-hexane. In this process, it is necessary to minimize organic solvent consumption and this can be achieved by recirculating solvent solution from the immersion bath to a solvent recovering means and then recycling the solvent to the extraction bath. However, during recirculation of the solvent, undesirable odors accumulate in the solvent, and such repeatedly processed organic solvent eventually imparts odors to soybean and/or soy protein products.

Various techniques have been tried to overcome this problem. For example, in the case of ethanol extraction, although soybean and/or soy protein products are freed of solvent after the extraction under a reduced pressure of 5 mm Hg at 80° C. for 10 hours, the components which give rise to undesirable odors and tastes in the soy products and also the odor of ethanol can not be completely removed under the reduced pressure conditions. In another prior art technique the recirculated solvent can be refined with an active carbon or ion-exchange resin. However, undesirable odors can not be completely removed or the refining costs are very high. In yet another prior art method (U.S. Pat. No. 3,897,574), the components which give rise to undesirable odors and tastes in soy products are removed by distillation. However, it is difficult to remove all kinds of undesirable odors and taste components from the soy products by this method. Therefore, a need continues to exist for a satisfactory method by which constituents of undesirable odors and tastes can be removed from soy beans and soy protein products.

SUMMARY OF THE INVENTION

Accordingly, one object of the present invention is to provide a method for efficiently removing the components which give rise to undesirable odors and taste in soy products in alcohol-water mixtures used in the extraction of soybeans and/or soy protein.

Briefly, this object and other objects of the present invention as hereinafter will become more readily apparent can be attained by providing a process of producing soybean and/or soy protein products, which is composed of: (a) contacting a soy protein-containing material with an ethanol-water mixture, (b) separating the liquid fraction from the suspension of step (a), (c) dividing the liquid fraction into two portions, (d) diluting the first portion with water to an ethanol concentration of less than 40%, (e) subjecting the diluted portion to extractive distillation in a tower at a temperature in the range of 80° C. to 95° C., (f) removing volatile materials from the diluted portion and recovering distillation bottoms from the extractive distillation, (g) subjecting the distillation bottoms to azeotropic distillation and recovering the distilled portion thereof, and (h) combining the distilled portion with the second portion of step (c) as the feed material for step (a).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
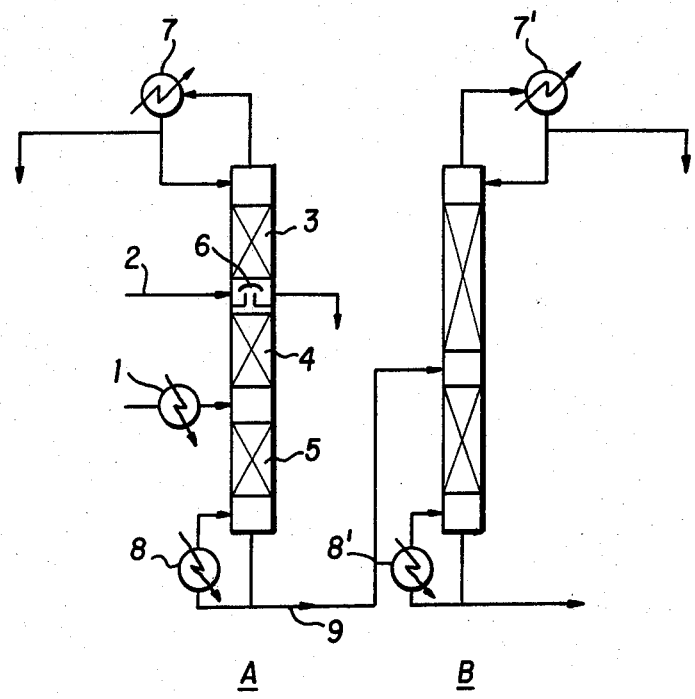
FIG. 1 shows an extractive distillation tower in which an aqueous soy protein containing fraction can be distilled.

Suitable soy protein-containing materials which are employed in the present invention include for example, defatted soybeans, concentrated soy proteins, extracted soy proteins, and isolated soy proteins. The proteinaceous product can be used in any form such as a powder, a block of material, or a textured material. When an isolated soy protein is used as the starting material, the alcohol extraction process of the present invention can be used on any material obtained at any point in the isolation process. Preferably, however, the precipitated protein curd obtained in the isolation process is used as the starting material for the extraction process of the present invention since the precipitated protein curd does not contain as many components which give rise to undesirable odors and taste as defatted soybean. Moreover, the amount of ethanol required for extraction is rather small.

In the extraction medium the ethanol concentration in the ethanol-water mixture should be greater than 50%, preferably 60 to 95%. The ethanol-water mixture may contain another organic solvent such as n-hexane or methanol.

In the first step of the extraction process, the soy protein-containing materials are contacted with the ethanol-water mixture. The weight ratio of ethanol-water mixture to the soy protein-containing material is from 0.85 to 2.5. If the weight ratio is less than 0.85, satisfactory extraction is not achieved. If the ratio is larger than 2.5, the consumption of ethanol is enormous. Upon extraction the soluble constituents in the soy protein-containing materials dissolve in the ethanol-water mixture. The insoluble components can be separated by any known methods such as by extraction, decantation, or filtration. Counter current extraction is most useful.

The extracted solid soy protein-containing materials are then freed of solvent by such conventional methods as evaporation of the solvent at a low pressure at a temperature of from 80° C. to 90° C. for from 20 minutes to 30 minutes. The protein flakes obtained are dried and ground into a final product.

The liquid fraction which is separated from the suspension in the extraction step is preferably decanted in order to remove precipitated material which still remains in the liquid fraction. While the liquid fraction is colorless and transparent, it still has undesirable odors which are different from soybean odor. Moreover, 10 to 15 peaks can be detected by gas chromatography. The components of undesirable odor and taste are difficult to remove, even if the liquid fraction is treated by an activated carbon material.

A unit amount of the liquid fraction is divided into first portion which is 0.5 to 0.1 of the whole and a second portion which is 0.5 to 0.9 of the whole. That is, it is not necessary to refine the entire amount of the liquid fraction. The actual ratio of first portion to second portion employed is determined by the quality of the required product.

The first portion is diluted with water to an ethanol concentration of less than 40%, preferably less than 20%. The diluted portion is subjected to extractive distillation by a common method. Preferably, the apparatus illustrated in FIG. 1 is employed.

In FIG. 1, A represents the tower for the extractive distillation of the liquid fraction, and B represents the azeotropic distillation tower for the production of refined alcohol. For these distillation towers it is preferable to use a packed tower or a plate tower. A reboiler or a steam injector is preferably used as a source of heat. In FIG. 1, the liquid fraction is fed into tower A through supply nozzle 1, while hot water is supplied through nozzle 2. The tower is divided into concentration zone 3, distillation zone 4, separation zone 5, oil component decanter 6, condensers 7 and 7', heating apparatuses 8 and 8' and pipe 9 which supplies the distillation bottoms of tower A to tower B.

In the operation of tower A, the liquid fraction which contains the components of undesirable odor and taste is supplied into the tower through supply nozzle 1 which is mounted to the top of separating zone 5 and is diluted with hot water which is supplied from the supply nozzle 2 mounted to decanter 6, to yield an ethanol concentration of less than 40%, preferably less than 20%. Preferably, the hot water and the decanter are heated to a temperature of from 80° C. to 95° C. The liquid fraction is diluted with the hot water and falls to separating zone 5. Then the diluted portion is heated to a temperature of from 83° C. to 92° C. The generated ethanol-water vapor which contains the components of undesirable odor and taste is subjected to counter current extraction with the hot water in distilling zone 4. In this zone the material which has relatively low volatility is absorbed by water. Some of the components of undesirable odor and taste which are insoluble in water are removed through decanter 6. Therefore, the components of undesirable odor and taste which have almost the same boiling point as ethanol and which are insoluble in water are removed. Thus, the problem of deodorization is completely solved.

In concentrating zone 3, the liquid fraction is concentrated to the azeotropic component under reflux conditions. Then the components of undesirable odor and taste which have relatively low volatility in comparison with ethanol are removed as a distillate.

The ratio of the distilling rate of the distillate to the feeding rate of the ethanol-water mixture is preferably less than 0.05. The reflux ratio is from 5 to 500, and a larger ratio is preferred.

The temperature of the distillation bottoms ranges from 83° C. to 92° C. In order to obtain a more purified ethanol, the distillation bottoms are heated to about 92° C., and in order to raise the recovery yield of the ethanol, the distillation bottoms are heated to about 83° C.

The distillation bottoms in tower A can be transferred to tower B through pipe 9, and where they are subjected to azeotropic distillation. The distillate from tower B is used with the second portion obtained from the original liquid fraction generated by contacting a soy protein-containing material with a solvent-water mixture. If necessary, the ethanol concentration of this fraction can be adjusted to the concentration mentioned before. The bottoms from tower B may be used as the source of hot water used in tower A.

The soybean and/or soy protein products prepared by the method of the present invention do not possess undesirable odors and taste by sensory evaluation.

Having generally described this invention, a further understanding can be obtained by reference to certain specific examples which are provided herein for purposes of illustration only and are not intended to be limiting unless otherwise specified.

EXAMPLE 1

Defatted soybean flakes were freed of solvent in a solvent removing toaster to give denatured defatted soybean flakes having a Nitrogen Solubility Index (NSI) of 50%. The raw flakes were contacted with an ethanol-water mixture in which the ethanol concentration was about 80%. The ethanol-water mixture was used repeatedly nine times for the extraction of the raw flakes. The ethanol concentration in the ethanol-water mixture so used was 76%.

A 350 kg amount of raw flakes was contacted at about 80° C. with 770 kg of the ethanol-water mixture which was used nine times, and 436 kg of wet flakes and 684 kg of a liquid fraction were obtained. The wet flakes were desolventized at 80° C. for 20 minutes under a pressure of 720 mmHg, and dried, obtaining 139 kg of evaporate. The evaporate was mixed with the liquid fraction. The dried flakes were ground and sieved and 274 kg of soybean products (Product B) were obtained.

While the liquid fraction was colorless and transparent, it had an undesirable odor and contained 75.5% ethanol. Moreover, fifteen components were detected in the liquid fraction by gas chromatographic analysis. One third of the liquid fraction was refined in the apparatus of FIG. 1 as follows: The liquid fraction was supplied to the separating zone 5 of tower A from supply nozzle 1 at a feed rate of 250 kg/hour, and diluted by hot water (90° C.) which is supplied from the supply nozzle 2 at the feed rate of 1654 kg/hour. The liquid fraction which contained the components of undesirable odor was vaporized in separating zone 5, was contacted with hot water in refining zone 4, and then was introduced into concentrating zone 3, where the concentration of undesirable odor was increased. The ethanol in the liquid fraction was concentrated under reflux conditions (a reflux ratio of 300 and a temperature of 78° C.) to form an azeotropic composition (ethanol:water=90:10). The low boiling point components which contained undesirable odors were removed as a distillate with ethanol. The temperature of the distillate was about 78° C. The rate of removal of the distillate was 2.22 kg/hour.

The components insoluble in water which had boiling points higher than ethanol were removed as oil components (ca. 90° C.) through decanter 6, at a removal rate of 3 kg/hour.

The distillation bottoms (ethanol concentration: 10%) were supplied through pipe 9 into tower B at the feed rate of 1900 kg/hour. In tower B the distillation bottoms were subjected to azeotropic distillation (reflux ratio: 2.0). A distilled portion (ethanol concentration: 80%) was obtained at a rate of 238 kg/hour as refined ethanol. The refined ethanol had no undesirable odors and could not be distinguished from reagent ethanol (recovery yield of ethanol: 97.9%).

The two thirds portion of the liquid fraction mentioned above (548 kg) was mixed with 222 kg of the refined ethanol, and a 770 kg amount of an ethanol-water mixture having a 76.8% ethanol concentration was obtained. The raw flakes mentioned above (350 kg) were contacted with the ethanol-water mixture, and 274 kg of soybean products (product A) were obtained in the same manner as mentioned above.

As the ethanol-water mixture 80%, ethanol reagent and the refined ethanol were used for the comparison, and soybean products were obtained in the same manner as mentioned above. (Product C for reagent ethanol and Product D for refined ethanol).

A sensory evaluation of odors was conducted by twenty persons on soybean products A, B, C, and D and the results are shown in Table 1.

Table 1

| Product | A | B | C | D |
|---|---|---|---|---|
| Scale* | 0.7 | 4.0 | 0 | 0 |

*(Scale 0; odorless 4.0: vary strong obnoxious odor)

EXAMPLE 2

In the method described in Example 1, the feed rate of the hot water was changed and distillation bottoms of 10%, 20%, 40%, and 60% ethanol concentration were obtained.

The distillation bottoms of the tower A were refluxed in tower B and the refined ethanol (the ethanol concentration: 80%) were obtained in the manner described in Example 1. The refined ethanols thus obtained were used for the extraction of the raw flakes.

A sensory evaluation of odors was conducted in the same manner described as Example 1, and the results are shown in Table 2.

Table 2

| Ethanol Concentration in the Bottom of Tower A | Scale |
|---|---|
| 10% | 0 |
| 20% | 0.5 |
| 40% | 1.5 |
| 60% | 3.5 |
| 77.2 (comparison) | 4.0 |

Figure 2:
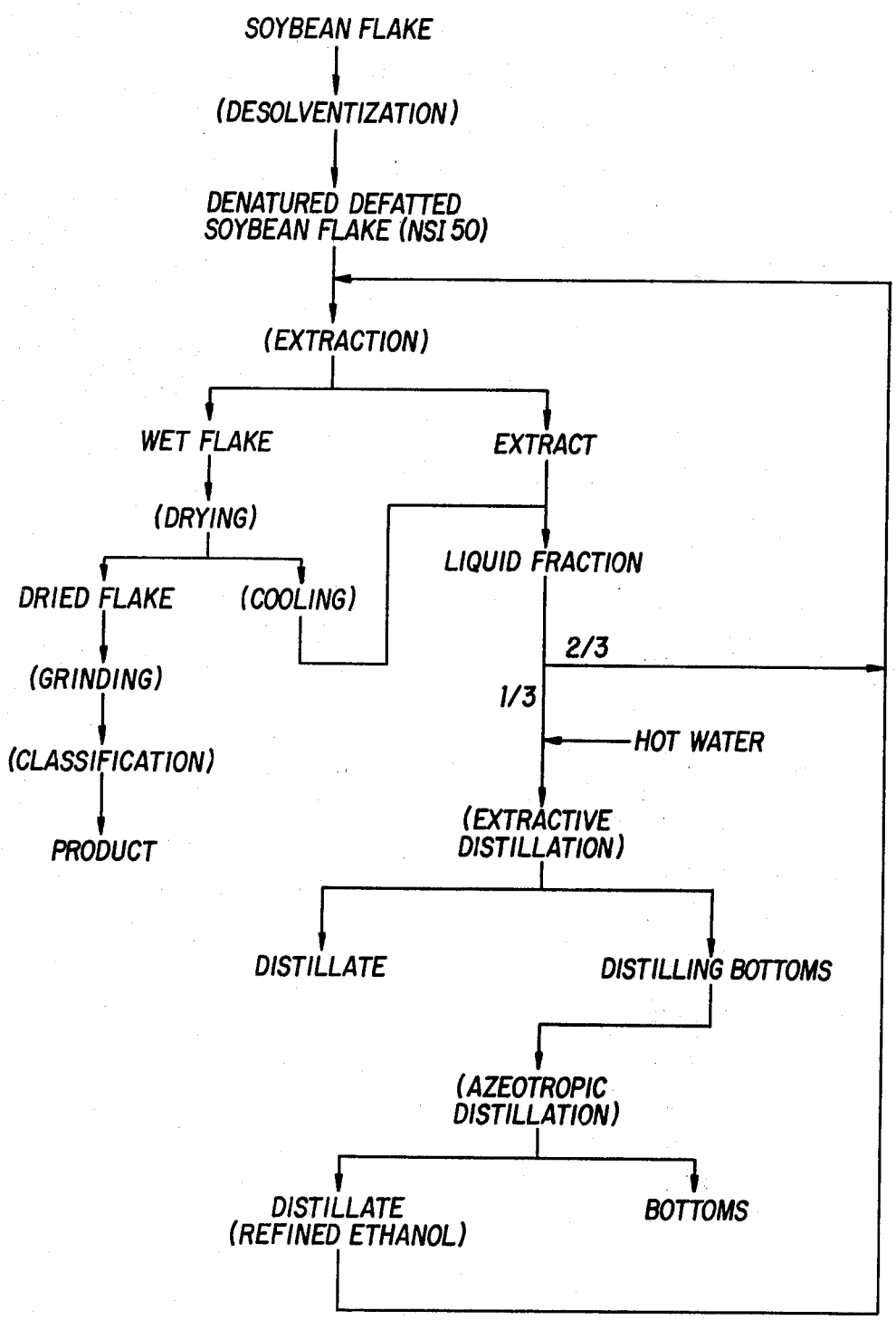
FIG. 2 is a flow scheme showing the present process adapted to an industrial scale operation.

FIG. 2 shows an adaptation of the present process to an industrial scale operation in which soybean flakes are freed of solvent to yield a denatured product. The denatured product is extracted thereby yielding an extract and wet flakes which are separated from each other. The liquid extract is then divided into a first portion which is one third the original volume of the extract phase and a second liquid portion which is the remaining two thirds of the extract, the first portion is treated with hot water and then extractively distilled. The distillate bottoms obtained are subjected to azeotropic distillation thereby yielding a bottoms fraction and a distillate portion which is refined ethanol. The refined ethanol combined with the second liquid portion and the mixture is returned to the first stage of the process where the denatured soybean flakes are extracted.

The wet flakes obtained directly from the extraction process are dried, ground and then classified into various products. The liquid solvent obtained from the wet flakes during drying is combined with the liquid extract after separation of the extract phase from the wet flakes.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A process of producing soybean and/or soy protein products, which comprises the steps of:
    (a) contacting a soy protein-containing material with an ethanol-water mixture;
    (b) separating the liquid fraction from the suspension of step (a);
    (c) dividing the liquid fraction into first and second portions;
    (d) diluting the first portion with water to an ethanol concentration of less than 40%;
    (e) subjecting the diluted portion to extractive distillation in a tower at a temperature in the range of 80° C. to 95° C.;
    (f) removing volatile materials from said diluted portion and recovering distillation bottoms from said extractive distillation;
    (g) subjecting the distillation bottoms to azeotropic distillation and recovering the distilled portion thereof; and
    (h) combining said distilled portion with said second portion of step (c) as the feed material for step (a).

2. The process of claim 1, wherein the ethanol concentration in the ethanol-water mixture is above 50%.

3. The process of claim 1, wherein, in step (c), a unit amount of said liquid fraction is divided into a quantity ranging from 0.1 to 0.5 of said unit amount as said first portion.

4. The process of claim 1, wherein volatile and water-insoluble constituents are removed from the diluted portion through a decanter mounted in the middle of the extractive distillate tower, and wherein volatile portions of said diluted portion having boiling points less than ethanol are removed as a distillate.

5. The process of claim 1, wherein said soy protein containing material is defatted soybeans, concentrated soy proteins, extracted soy proteins or isolated soy proteins.

6. The process of claim 2, wherein the ethanol concentration in the ethanol-water mixture ranges from 60 to 95%.

7. The process of claim 1, wherein, in step (a), the weight ratio of said ethanol-water mixture to said soy protein-containing material ranges from 0.85 to 2.5.

8. The process of claim 3, wherein in step (c), the amount of said second portion ranges from 0.5 to 0.9 times the unit amount of the liquid fraction.

9. The process of claim 1, wherein the temperature of said distillation bottoms ranges from 83° C. to 92° C.

10. The process of claim 1, wherein said ethanol-water mixture contains an n-hexane or methanol solvent component.

* * * * *